UNITED STATES PATENT OFFICE 2,046,656

PRODUCTION OF HORMONE PREPARATIONS OF HIGH PURITY

Erwin Schwenk, Berlin-Westend, and Friedrich Hildebrandt, Berlin, Germany, assignors to Schering-Kahlbaum A. G., Berlin, Germany No Drawing. Application October 10, 1932, Serial No. 637,202. In Germany October 17, 1931

11 Claims. (Cl. 260—131)

Our invention refers to the production of hormone preparations and more especially pure hormones of the germinal glands.

It is an object of our invention to provide means whereby purer preparations than were hitherto obtainable can be produced in a particularly simple and efficient manner.

As is well known to those skilled in the art, the preparation of pure hormones of the germinal glands encounters particularly great difficulties for the reason that minute quantities of the hormones are mixed with large quantities of neutral substances having the character of lipoids, so that purification by mere physical means requires the treatment of great quantities of the raw material and great expenditure of time without leading to altogether satisfactory results.

We have now found that it is possible to effect a perfect purification of the hormone preparations by treating the crude substances with compounds such as the derivatives of the hydroxy- and the di-carboxylic acids of the aromatic series which contain, besides a group adapted for condensation with the hormone, a group capable of forming salts or a group, such as for instance, the nitro group, which can easily be converted into a salt-forming group (amino group). By separating the condensation products thus obtainable from that part of the starting products, which has not entered into the reaction, and by subsequent decomposition of the condensation products, hormone preparations of great purity are obtained.

We have found for example that the male sexual hormone can be separated from the more or less neutral substances accompanying same by melting the crude preparations down with phthalic anhydride. The anhydride will then react with the alcoholic hydroxyl groups of the substances present in the crude hormone preparation and acid phthalic acid esters are formed, which can be separated from the non-reacted parts by extraction with dilute soda solution. The efficient principle of the original hormone preparation is accumulated entirely in the part esterified with phthalic acid and can be isolated quantitatively by hydrolysis of the acid phthalic acid esters and extraction with a suitable solvent.

A similar reaction takes place also with the female germinal gland hormone. Crude preparations containing same are known to contain several hormones, for instance the keto-oxy-oestrin having the formula $C_{18}H_{22}O_2$ and the trihydroxy-oestrin $C_{18}H_{24}O_3$. In accordance with the chemical constitution of these compounds the first-mentioned hormone will be found in the part, which has not undergone esterification, while the part esterified with phthalic acid contains the hormone $C_{18}H_{24}O_3$, which includes alcoholic hydroxyl groups.

Instead of phthalic anhydride and other acid anhydrides, such as succinic acid anhydride many other compounds may be used, such as for instance the chlorides of hydroxy-carboxylic acids of the aromatic series. In this case there are for instance obtained compounds corresponding to the formula OH.R.COOR', wherein R is any aromatic radicle, while R' is the hormone radicle. The compound thus produced will then be found in those parts, which are soluble in an alkali and from these, after the non-reacted parts of the crude preparation have been separated, by hydrolysis the hydroxy-carboxylic acid on the one hand and a preparation on the other hand can be separated, which contains the hormone in purer form.

In a similar manner, if for instance keto groups are present, as is the case for instance in the follicle hormone $C_{18}H_{22}O_2$, a combination with phenyl hydrazinesulfo acid can be effected. In the part of the reaction mass, which is soluble in soda solution, there will then be found the sulfo phenyl hydrazone of the hormone $C_{18}H_{22}O_2$.

In practicing our invention, we may for instance proceed as follows:—

Example 1

100 grams of a crude oil obtained by extraction of male urine, 7 to 10 milligrams of the oil corresponding to 1 capon unit, are heated 6 hours with 100 grams phthalic anhydride to about 120 to 140° C. The mass is then diluted with the 3- to 4-fold quantity of ether and exhaustingly extracted by shaking with dilute soda solution of 10% concentration. The portion, (salt) which has dissolved in the soda solution, is isolated by acidulating and extracting with ether and is then hydrolyzed by boiling with 50 grams caustic soda solution of 5% concentration. The reaction mixture is extracted with ether to obtain the pure hormone preparation in the form of a brownish highly viscous oil of not unpleasant smell, 1 to 3 milligrams of which are found to correspond to 1 capon unit. The hormone thus recovered has the structural formula

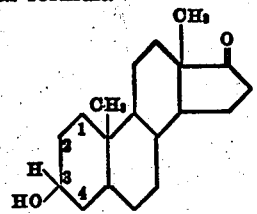

Example 2

A crude oily hormone preparation isolated in the usual manner from the urine of pregnant women and containing about 200,000 mice units per gram is combined by melting with an equal quantity of phthalic anhydride as described with reference to Example 1. After dilution with ether the mass is extracted by shaking with soda solution. Part of the hormone values present dissolves in the soda while the bulk is found in the soda solution, while the hormone $C_{18}H_{22}O_2$ unchanged remains in the etheric layer. After concentration and hydrolysis, the portion recovered from the ether layer is extracted with ether and after evaporation of the ether a hormone preparation is recovered containing about 1,000,000 to 2,000,000 mice units per gram. This preparation is a brownish coloured oil, in which crystals are gradually formed. On triturating this oil with ethyl acetate and petrol ether, crude crystals of the follicle hormone $C_{18}H_{22}O_2$ are obtained, which can be recrystallized from dilute alcohol and then has a melting point of 240° C. The structural formula of this hormone is

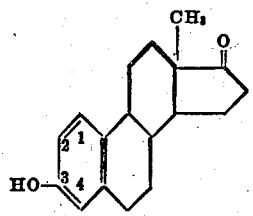

Example 3

The raw material referred to in Example 2 is diluted in toluene and heated with a solution of salicylic acid chloride in toluene. After 5 hours the reaction has come to an end and the cooled solution is then shaken repeatedly with highly diluted caustic soda solution. The different portions of this caustic soda solution are combined and by supersaturating same with carbon dioxide an oily substance is precipitated therein, which is extracted by shaking with ether. After evaporation of the ether the residue is hydrolyzed by boiling with caustic soda. The solution is supersaturated with carbon dioxide and extracted with ether. After removal of the solvent there remains over the purified follicle hormone $C_{18}H_{22}O_2$ having the form of a dark brown oil, from which after prolonged standing crystals separate out, which can be treated further as described with reference to Example 1. Alternatively the oil can be distilled as a whole in a high vacuum and the distillate, which has a tendency to crystallize, is the follicle hormone $C_{18}H_{22}O_2$.

In its broad aspects our invention contemplates recovering a germinal gland hormone having an —OH group in the 3-position, from a crude preparation containing the same, by reacting said preparation with a compound of the benzene series having the general formula:

wherein R is a benzene residue, Y is a group selected from a class consisting of —COCl, or —COOH, X is the group —COOH, —SO₃H, —NO₂, —OH or —NH₂, while X and Y together may represent the group

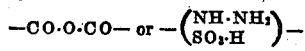

said reaction being followed by separation of the resulting alkali-soluble portion from the ether soluble portion of the reaction products, usually by extraction with a dilute alkali, hydrolysis and recovery of a purified hormone preparation from at least one of said portions. The compound with which the hormone preparation is reacted in the first step of our process can also be defined as a benzene compound having an acid, ester-forming group capable of reacting with said preparation with formation of an alkali soluble portion and an ether soluble portion.

Various changes may be made in the details disclosed in the foregoing specification without departing from the invention or sacrificing the advantages thereof.

We claim:—

1. In the recovery of germinal gland hormones having an —OH group in the 3-position, the process which comprises heating a crude preparation containing such a hormone with a benzene compound capable of condensing with said hormone with elimination of water to produce an alkali-soluble ester, separating the alkali-soluble ester thus produced by extraction with dilute alkali, hydrolyzing said ester and recovering the hormone thus liberated.

2. In the recovery of germinal gland hormones having an —OH group in the 3-position from crude preparations containing the same, the process which comprises heating such a crude preparation with a benzene compound having an acid, ester-forming group capable of reacting with said preparation with the formation of an alkali soluble portion and an ether soluble portion, treating the reaction products with a dilute alkaline solution to separate the alkali soluble portion from the ether soluble portion and recovering a germinal gland hormone from at least one of said portions.

3. The process of claim 2 wherein the benzene compound is phthalic anhydride.

4. The process of claim 2 wherein the benzene compound is an acid chloride of a hydroxy-carboxylic acid having the general formula OH.R.COCl, wherein R stands for the benzene radical.

5. The process of claim 2 wherein the benzene compound is an acid anhydride.

6. In the recovery of germinal gland hormones having an —OH group in the 3-position, the process which comprises effecting condensation of such hormones contained in a crude preparation thereof with phthalic acid anhydride, dissolving the resulting product in an organic solvent, separating the hormone compound from the remaining substances by extracting the resulting solution with an aqueous soda solution, hydrolyzing the constituent containing the hormone and isolating the hormone proper.

7. In the recovery of germinal gland hormones having an —OH group in the 3-position, the process which comprises melting down a crude preparation of such hormones with phthalic anhydride, whereby condensation thereof with the hormone is produced, extracting the product with a dilute caustic alkali solution acidifying the alkali extract, then extracting it with ether, hydrolyzing the ethereal extract with caustic alkali and recovering the hormone.

8. In the recovery of germinal gland hormones having an —OH group in the 3-position, the process which comprises effecting condensation between a crude preparation of such hormones and salicylic acid chloride, dissolving the resulting condensation product in an organic solvent, separating the resulting alkali soluble portion from the ether soluble portion of the said condensation product by extraction with an aqueous soda solution, decomposing the portion containing the hormone and recovering the hormone.

9. In the recovery of germinal gland hormones having an —OH group in the 3-position from crude preparations containing the same, the process which comprises heating such a crude preparation with a compound of the benzene series capable of condensing with said hormone and having the general formula:

$$X-R-Y$$

wherein R is a benzene residue, Y is one of the group —COCl, and —COOH, X is one of the group —COOH, —SO$_3$H, —NO$_2$, —OH and —NH$_2$, while X and Y together may represent one of the group

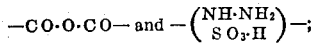

separating the resulting alkali soluble portion of said crude preparation from the other soluble portion, hydrolyzing at least one of said portions and recovering a purified hormone preparation therefrom.

10. The process which comprises heating phthalic anhydride with a crude material containing the male germinal gland hormone, diluting the reaction product with ether, extracting with a dilute alkaline solution, acidulating the extract obtained, extracting the acidified solution with ether and thereby recovering a purified preparation of the male germinal gland hormone.

11. The process which comprises heating phthalic anhydride with a crude preparation containing the follicle hormone, diluting the reaction product with ether, extracting the ether solution with a dilute alkaline solution, recovering the portion soluble in ether, concentrating and hydrolyzing this portion and recovering a purified preparation of the said follicle hormone therefrom.

ERWIN SCHWENK.
FRIEDRICH HILDEBRANDT.